United States Patent [19]

Dagata

[11] Patent Number: 4,813,805
[45] Date of Patent: Mar. 21, 1989

[54] JOINT FOR CARBON ELECTRODES

[75] Inventor: Frank J. Dagata, Middleburg Heights, Ohio

[73] Assignee: Union Carbide Corporation, Danbury, Conn.

[21] Appl. No.: 190,681

[22] Filed: May 5, 1988

[51] Int. Cl.⁴ .............................................. F16B 13/00
[52] U.S. Cl. ..................................... 403/32; 403/296; 403/DIG. 5; 313/334
[58] Field of Search .................. 403/296, DIG. 5, 32; 313/334, 335, 357; 373/92

[56] References Cited

U.S. PATENT DOCUMENTS

| | | | |
|---|---|---|---|
| 2,482,176 | 9/1949 | Hamister | 403/296 |
| 2,510,230 | 6/1950 | Johnson et al. | 403/267 |
| 2,735,705 | 2/1956 | Johnson et al. | 403/267 |
| 2,828,162 | 3/1958 | Johnson et al. | 403/DIG. 5 |
| 3,048,433 | 8/1962 | Doetsch | 403/296 |
| 4,002,942 | 1/1977 | Gaboury | 373/92 |
| 4,435,816 | 3/1984 | Belz et al. | 373/91 |

Primary Examiner—Randolph A. Reese
Assistant Examiner—Carol I. Bordas
Attorney, Agent, or Firm—James L. Sonntag

[57] ABSTRACT

A joint for electrodes with a peg securing electrode members together produces an electrode joint of superior strength, and with resistance to thermal, and mechanical stress which tend to loosen the joint.

14 Claims, 5 Drawing Sheets

JOINT FOR CARBON ELECTRODES

FIELD OF THE INVENTION

The Present invention involves a carbon electrode joint with improved tensile strength, and higher resistance to torsional forces which may unscrew a threaded joint.

BACKGROUND OF THE INVENTION

Electrodes used in electric arc furnaces typically comprise joined sections of graphitic or non-graphitic carbon to form an electrode column. As the electrode column is consumed during operation of the furnace, new electrode sections are periodically joined at the non-consuming end of the electrode column. The sections are typically joined by a joint comPrising a female threaded socket in one section which joins a threaded male nipple in the adjoining section. The male nipple is usually formed by screwing a double ended threaded nipple into a threaded socket. These joints are generally satisfactory but are subject to unscrewing which results in loose joints, breakage of the electrode at the joint, and loss of the electrode section below the joint.

One solution to this Problem is provided by the so-called Pitch-reservoir-filled joint (PRF), as described in U.S. Pat. No. 2,735,704, by providing pitch reservoirs in the electrode joint, such as by lateral Perforations in the nipple of the joint. During operation of the arc furnace, the heat of resistance generated by the electric current melts the pitch, which then flows between the mating threads of the nipple and the socket. Further heating of the joints causes the pitch to coke, thereby bonding the mating threads together. While the resulting coke bond inhibits unscrewing, vibration and thermal stresses on the joint often break the coke bond between the threads of the joint. Furthermore, the bonding coke is not evenly distributed between the mating threads, resulting in concentration of thermal and mechanical stresses at the bonded surfaces. This can lead to breakage of the joint, particularly at weak points where the joint has been perforated for the pitch reservoirs. For example, in joints with pitch reservoirs in lateral holes through the joint nipple, breakage of the nipple at the holes is a problem. It would be desirable, therefore, to provide a method which is more effective than the pitch reservoir method to prevent unscrewing while avoiding weakening of the joint.

An other problem with PRF joints occurs when there is a breakage of the nipple, leaving a broken half of the nipple in the socket of the electrode segment above the broken joint. In order to reuse the electrode segment, the broken portion of the nipple remaining in the socket must be removed to allow attachment of an unbroken nipple. With PRF joints, coke bonds the threads of the nipple and the socket together, rendering it impossible or very difficult to unscrew and remove the broken nipple portion without damaging the threads of the socket. Thus, in order to reuse the electrode segment, the end of the electrode segment containing the broken nipple is generally cut off, and a new threaded socket machined into the end of the segment.

OBJECTS OF THE INVENTION

An object of the invention is to provide a stronger joint between electrode segments which is resistant to tensile and torsional forces which may result in failure of the joint.

It is an object of the invention to provide a method for inhibiting the unscrewing of electrode joints which is more effective than methods using pitch reservoirs.

It is further an object of the invention to provide a method for inhibiting the unscrewing of electrode joints which does not weaken the joint by concentration of thermal and mechanical stresses.

It is also an object of the invention to provide an electrode joint which enables removal of a broken nipple from a socket without damaging the threads of the socket.

SUMMARY OF THE INVENTION

An embodiment of the present invention is a joint for a carbon electrode which comprises:
  an upper member with a bottom surface;
  a lower member with a top surface;
  means for maintaining the top surface and bottom surface in opposing relationship;
  a peg hole extending from the bottom surface into the upper member;
  a peg dimensioned to slide in the peg hole;
  releasable retention means in the peg hole which retains the entire length of the peg in the peg hole, which upon heating of the joint to an operating temperature releases the peg to slide within the peg hole;
  a catch hole extending from the top surface into the lower member, the catch hole being aligned with the peg hole such that when the peg is released, a lower portion of the peg slides from the peg hole into the catch hole with an upper portion of the peg remaining in the peg hole;
  upper securing means which secures the upper portion of the peg in the peg hole after the lower portion of the peg has slid into the catch hole; and
  lower securing means which secures the lower portion of the peg in the catch hole after the lower portion of the peg has slid into the catch hole.

The bottom surface of the upper member and the top surface of the lower member oppose or contact each other, or are spaced from each other in an opposing relationship. The means for maintaining the bottom and top surfaces in opposing relationship is generally a conventional combination of a tapered and threaded female socket and mating male nipple. However, other means may be used, such as, for example, pinned joints, interlocking mechanisms, or non-tapered or otherwise non-conventional threaded joints.

In a preferred embodiment of the invention, the electrode segments are cylindrical solids joined end to end to form an electrode column by a joint comprising a threaded male nipple on one segment that screws into a matching female socket in the adjacent segment. The longitudinal axes of the socket and nipple preferably correspond to the axes of the cylindrical segments. The threaded male nipple may be formed by machining the end of the segment or by prescrewing a double-ended nipple with male threads on both ends into a threaded female socket. The upper member may correspond to the segment with the male nipple and the lower member correspond to the segment with the female socket. In this instance, the bottom surface corresponds to the end face of the male nipple, and the top surface to the base of the female socket. In an alternate embodiment, the upper member corresponds to an upper electrode segment with a female socket, and the lower member corresponds to a lower electrode segment with a male nipple. In this embodiment, the top surface corresponds to the end face of the male nipple, and the bottom surface to the base of the female socket.

The peg hole extends from the bottom surface of the upper member, and the catch hole extends from the top surface of the lower member. preferably, the center axis of the peg hole and catch hole correspond with the cylindrical axis of the electrode section, and hence the axis of the socket and nipple of the joint.

Preferably, the joint of the invention is incorporated into a conventional socket-nipple joint with two pegs as illustrated, for example, in FIGS. 1 and 4. For convenience, this configuration with be referred to herein as a "two-peg joint". The two-peg joint is for joining two adjoining electrode segments, each with a threaded socket. The electrode segments are joined by a nipple with threads on each end, which is threaded into the sockets of the segments. The two-peg joint comprises two pegs, with two top surfaces, one at the base of the socket of the lower electrode segment, and another at the top face of the nipple. Bottom surfaces are at the lower face of the nipple and at the base of the socket of the upper electrode segment.

Within the peg hole is a peg dimensioned to allow the peg to slide within the peg hole. The peg is retained in the peg hole by a releasable retaining means which prevents the peg from sliding from the peg hole and holds the entire length of the peg within the peg hole, until the joint is heated to an operating temperature.

An operating temperature is any temperature which is normally encountered by the joint during operation of the electrode on an electric arc furnace, and is above the normal temperature at which the electrode joint is assembled or stored. Operating temperatures contemplated by the invention are typically between 80° C. and 250° C. preferably between 100° C. and 160° C. The function of the retaining means is to hold the peg in the peg hole before and during assembly of the electrode joint. e.g. by screwing the electrode segments together. During use of the electrode column, the electrode joint is heated to an operating temperature, typically through resistance heating from current flowing through the joint, which causes the releasable retaining means to release the peg and allow the peg to slide within the peg hole. The releasable retaining means may be provided by any suitable means, for example, by a pitch or other composition which is solid at room temperature, but melts at an operating temperature.

A catch hole extending from the top surface of the lower member is aligned and dimensioned to receive the peg when it is released. This may be provided by aligning the center axis of the catch hole with the center axis of the peg hole.

When the electrode reaches operating temperature and the retaining means releases the peg, the peg slides in the peg hole and the lower portion of the peg slides into the catch hole. Only a lower portion of the peg slides into the catch hole with an upper portion of the peg remaining in the peg hole. This may be accomplished by any suitable means, such as by adjusting the depth of the catch hole or by providing abutment surfaces on the peg and in the peg hole which resist further travel of the peg from the peg hole.

An upper securing means secures the upper portion of the peg in the peg hole after the lower portion of the peg has slid into the catch hole. Likewise the lower securing means secures the lower portion of the peg in the catch hole. The upper and lower securing means may be provided by any suitable means, such as mechanical interlocking mechanisms. or by a material which cements surfaces of the peg hole and catch hole with the peg. This can be accomplished by a liquid material, such as pitch, which flows into the clearances between the peg surface and the peg and catch hole walls and form a cementitious material, such as coke, to secure the adjoining surfaces together.

The combination of an upper segment and a lower segment secured together by a peg, as in the joint of the invention, results in significant resistance to the forces which may loosen the joint. In joints where the maintaining means includes conventional tapered and threaded sockets and nipples, the secured peg resists torsional forces, and reduces or eliminates unscrewing of the joint.

In addition, the joints of the invention are generally more resistant to loosening than PRF joints without the disadvantages of PRF joints. The peg secured in both segments provides a larger area for current conduction between the electrode segments, and is less subject to variations of conductivity than PRF type joints. As a result, there is a smaller occurrence of localized areas of thermal stress than in PRF joints. In addition, localized mechanical stresses resulting from coke or other substances in between the threads of the joint are eliminated since the securing of the joint is at the peg and not on the threads.

An additional advantage, is the ease in which a broken nipple can be removed from a socket without damage of the threads of the socket. To remove the nipple, the center of the nipple is drilled out to remove the peg and/or loosen the securing means by which the peg is secured to the nipple. The broken nipple may then be simply screwed out. Since there was no cementing of the threads together, the threads are undamaged, and a new unbroken nipple of conventional design may be screwed into the socket. This avoids the expensive handling and machining required to recover a segment with a broken PRF joint.

BRIEF DESCRIPTION OF THE DRAWINGS

FIG. 5 is a cross-sectional view of a portion of a joint of the general configuration shown in FIG. 4 showing a peg retained in the peg hole before heating of the joint to an operating temperature.

DESCRIPTION OF THE INVENTION

Figure 1:
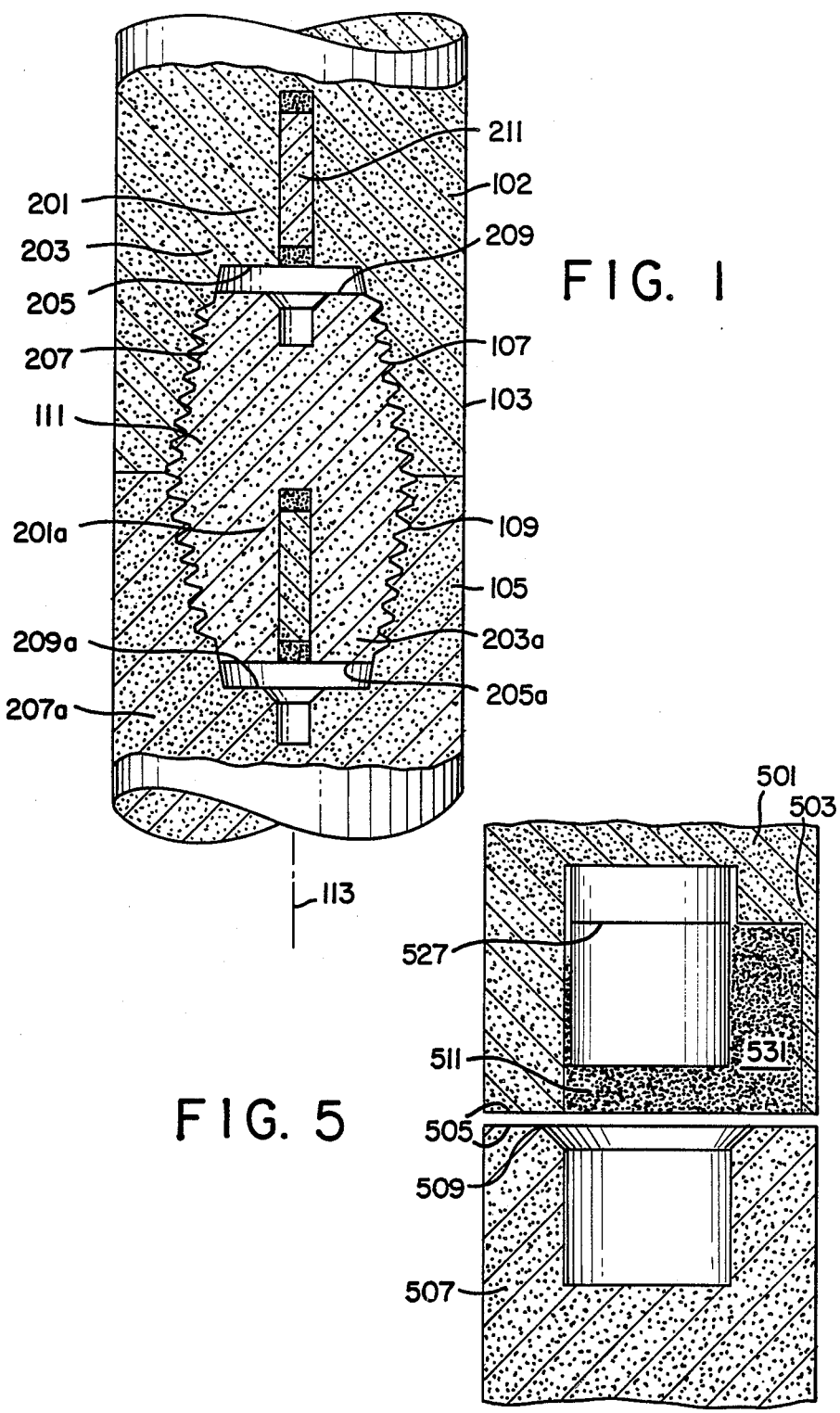
FIG. 1 is a cross-sectional view of a two-peg joint cut along the cylindrical axis of the electrode. The joint is shown before heating the joint to an operating temperature with the pegs retained in the peg holes.

FIG. 1 shows a two-peg joint of the invention. An electrode column 102 comprises an upper electrode segment 103 and a lower electrode segment 105, with upper and lower threaded sockets 107, 109, respectively. The electrode segments 103, 105 are joined by a double ended threaded nipple 111, which screws into the upper and lower sockets 107, 109 to join the upper and lower segments 102, 103.

The two-peg joint can be considered as a combination of two joints of the invention, designated here as upper joint 201 and a lower joint 201a. The upper joint 201 comprises an upper member 203 with a bottom surface 205, corresponding respectively to the upper electrode segment 103 and the surface at the base of the upper socket 107; and a lower member 207 with a top surface 209, corresponding respectively to the threaded nipple 111 and the surface of the upper face of the nipple 111. Likewise, the lower joint 201a has an upper member 203a with a bottom surface 205a, corresponding respectively to the threaded nipple 111 and the surface of the lower face of the nipple 111, respectively, and a lower member 207a with a top surface 209a, corresponding respectively to the lower electrode segment 105 and the surface at the base of the lower socket 109.

Figure 2:
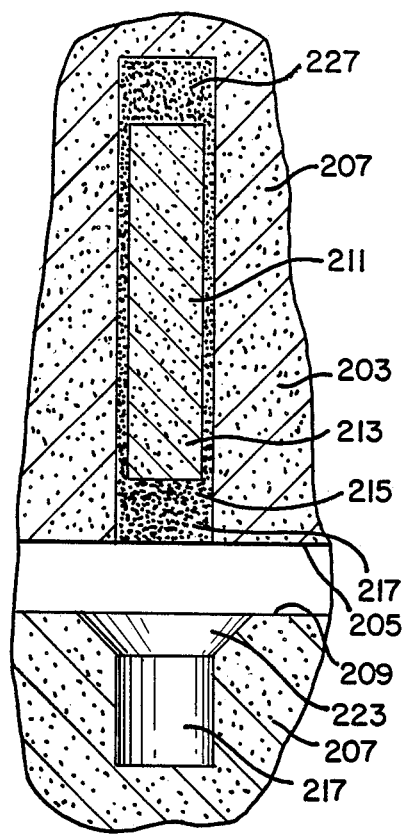
FIG. 2 is a portion of the cross-sectional view of FIG. 1 showing a peg retained in the peg before heating of the joint to an operating temperature.
Figure 3:
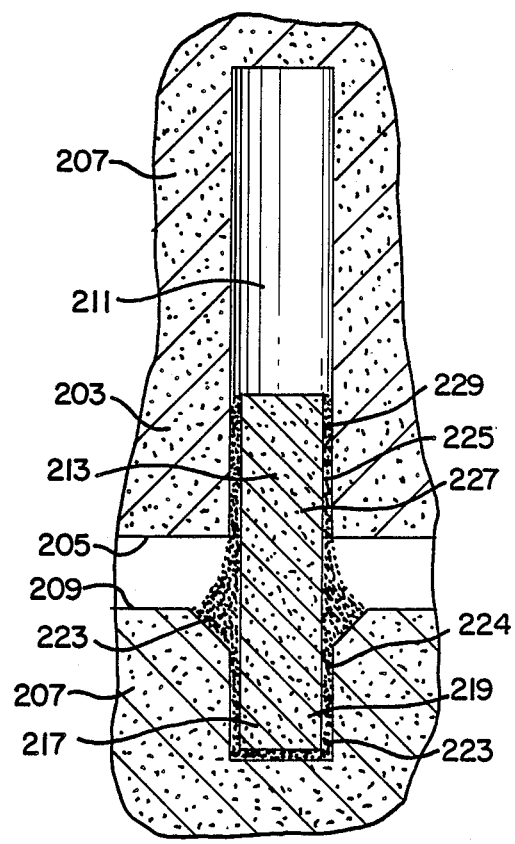
FIG. 3 is the joint as in FIG. 2 after heating the joint to an operating temperature and with the peg secured in the upper and lower member.

Referring to FIGS. 2 and 3, which show only the upper joint 201 of FIG. 1, the bottom surface 205 and top surface 209 are maintained in an opposing relationship by a maintaining means, which in this embodiment comprises the threaded nipple and socket combination of upper threaded socket 107, and threaded nipple 111 in FIG. 1.

A peg hole 211 in the upper member 203 extends from the bottom surface 205. Referring to FIG. 1, the peg hole 211 axis in this embodiment corresponds to the cylindrical axis 113 of the electrode column 102.

Referring again to FIGS. 2, and 3, in the peg hole 211 is a peg 213 dimensioned to slide in the peg hole 211, and retained in the peg hole 211 by releasable retention means 215 which in this embodiment is lower plug of pitch 217 (FIG. 2) disposed between peg 213 and the opening of the peg hole 211. During operation of the electrode, the joint 201 is heated to an operating temperature, melting the pitch of the lower pitch plug 215 in FIG. 2, releasing peg 213, and allowing peg 213 to slide in the peg hole 211.

Catch hole 217 extends from the top surface 209. Referring to FIG. 3, catch hole is aligned such that when peg 213 is released, a lower portion 219 of peg 213 slides from peg hole 211 into catch hole 217 with an upper portion 221 of peg 213 remaining in the peg hole 211.

Referring to FIG. 3, a lower securing means 223 is provided by melted pitch from the lower pitch plug (215 in FIG. 2) which flows into the clearance 224 between the wall of the catch hole 217 and a surface of the lower portion 219 of the peg 213. Further heat from operation of the electrode cokes this pitch, cementing together the wall of the catch hole 217 with a surface of the lower portion 219 of the peg 213. The clearance 224 is sufficient to allow the peg 213 to slide into the catch hole 217, yet small enough to retain sufficient pitch to form a cementitious bond when the pitch cokes. The coke provides the lower securing means 223, which secures the lower portion 219 of the peg 213 in the catch hole 217.

An upper securing means 225 (shown in FIG. 3) is provided by an upper pitch plug 227 (shown in FIG. 2) which is positioned above the peg 213 before the peg 213 is released. The heat which causes release of the peg 213 also melts the upper pitch plug 227. Melted pitch from the upper pitch plug 227 flows in a clearance 229 between a wall of the peg hole 211 and a surface of the upper portion 221 of the peg 213. Further heating from operation of the electrode cokes this pitch cementing the wall of the peg hole 211 with a surface of the upper portion 221 of the peg 213. The clearance 229 is sufficient to allow the peg 213 to slide into the peg hole 211, yet small enough to retain sufficient pitch to form a cementitious bond when the pitch cokes. This coke provides the upper securing means 225, which secures the upper portion 221 of the peg 213 in the peg hole 211.

The cross-sections taken perpendicular to the longitudinal axes of the peg hole 211, catch hole 217 and the peg 213 are typically circular. However, they may also be splined or of non-circular cross-section, such as square or hexagonal to provide further resistance to turning moments which would unscrew the joint 201.

The catch hole 217 may also have a bevel 223 at its opening in the top surface 219. The bevel assists the sliding of the lower portion 219 of the peg 213 into the catch hole 217, by compensating for irregularities and minor misalignment of the catch hole 217 and the peg 213 which may otherwise cause the peg 213 to hang and prevent the lower portion 219 of the peg 213 from the sliding into the catch hole 217.

The pitch in the lower and the upper pitch plugs 215 227 in FIG. 2 is preferably a low softening point pitch which melts soon after the electrode is heated in operation. Generally pitches with softening points below about 120° C. are suitable. Coke particles may be mixed with the pitch to increase the strength of the bond formed upon coking of the pitch. However, the coke particles should not be added to a degree to prevent the pitch from flowing freely when the operating temperature is reached. Typically, such a pitch composition comprises 60 weight percent pitch and 40 weight percent coke particles.

The peg 213 is constructed of a material which can retain its structural integrity at the temperatures encountered during operation of the electrode, and is preferably consumed with the electrode column 102. The peg 213 should also preferably be of a material that does not contaminate the molten metal being heated in the furnace with unwanted substances. The preferred material is graphite, more preferably a high tensile strength graphite, such as grade ATJ, available from Union Carbide Corporation, Danbury, Conn.

Figure 4:
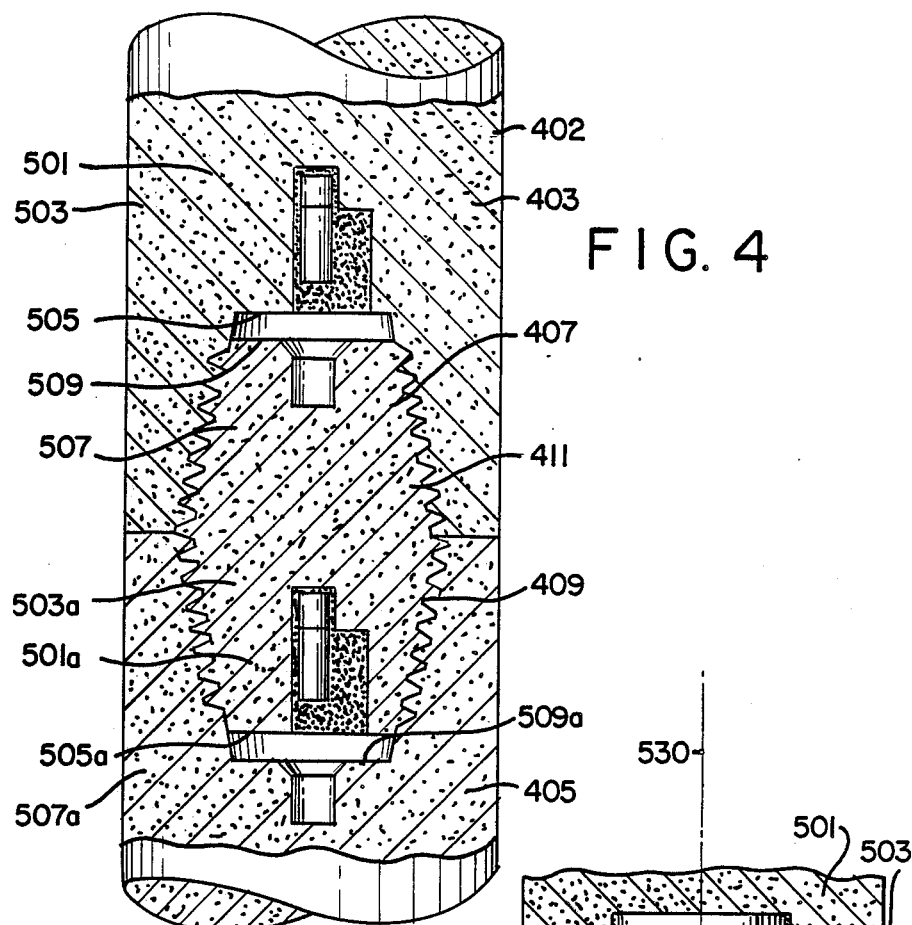
FIG. 4 is a cross-sectional view of an alternate two-peg joint of the invention cut along the cylindrical axis of the electrode and showing the pegs retained in the peg holes. The joint is shown before heating the joint to an operating temperature with the pegs retained in the peg holes.

FIG. 4 shows an alternate two-peg joint of the invention. An electrode column 402 comprises an upper electrode segment 403 and a lower electrode segment 405, with upper and lower threaded sockets 407, 409, respectively. The electrode segments 403, 405 are joined by a double ended threaded nipple 411, which screws into the upper and lower sockets 407, 409 to join the upper and lower segments 402, 403.

The two-peg joint of FIG. 4 can be described as comprising two joints of the invention, designated here an upper joint 501 and a lower joint 501a. The upper joint 501 comprises an upper member 503 with a bottom surface 505, corresponding respectively to the upper electrode segment 403 and the surface al the base of the upper socket 407 and a lower member 507 with a top surface 509, corresponding respectively to the threaded nipple 411 and the surface of the upper face of the nipple 411. Likewise, the lower joint 501a has a upper member 503a and a bottom surface 505a, corresponding respectively to the threaded nipple 411 and the surface of the lower face of the nipple 411, respectively, and a lower member 507a with a top surface 509a, corresponding respectively to the lower electrode segment 405 and the surface at the base of the lower socket 409.

FIGS. 5 to 9 illustrate an upper joint 501 from a two-peg point of the invention of the same configuration as in FIG. 4 but with the dimensions of the joint proportioned differently. The bottom surface 505 of the upper member 503 and top surface 509 of lower member 507 are maintained in an opposing relationship by a maintaining means, which in this embodiment comprises a threaded nipple and socket combination of upper threaded socket 407, and threaded pin 411 as in FIG. 4.

Figures 7, 8:
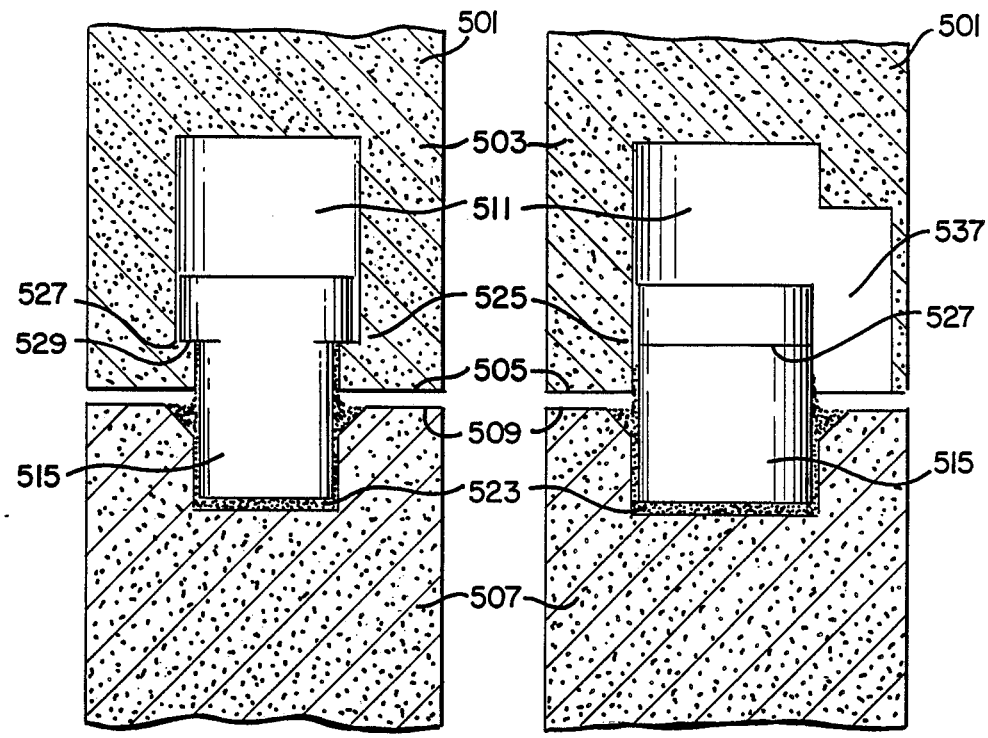
FIG. 7 is a cross-sectional view of the joint of FIG. 5 after heating to an operating temperature with the peg secured to the upper and lower members.
FIG. 8 is cross-sectional view of the electrode joint of FIG. 7 along the cylindrical axis and perpendicular to the view of FIG. 7.

A peg hole 511 extends in the upper segment 503 from the bottom surface 505, with a peg 513 dimensioned to slide in the peg hole 511. A catch hole 515 extends from the top surface 509 in the lower segment 507 A releasable retention means 515 is provided by a pitch plug 517 occupying volume of the peg hole 511 not occupied by the peg 513. (See FIGS. 5 and 6.) Upon heating the joint 501 to an operating temperature the pitch of pitch plug 517 melts, releasing the peg 513. The catch hole 515 is aligned such that when peg 513 is released, a lower portion 519 of the peg 513 slides from the peg hole 511 into the catch hole 515, with an upper portion 521 of the peg 513 remaining in the peg hole 511, as shown in FIGS. 7 and 8.

A lower securing means 523 (FIGS. 7 and 8) is provided by melted pitch originating from pitch plug 517 (in FIGS. 5 and 6). which has flowed into the clearance between the wall of the catch hole 515, and a surface of the lower portion 519 of the peg 513. Further heat from operating the electrode cokes the pitch. The coke forms the lower securing means 523 which secures the wall of the catch hole 515 to the surface of the lower portion 519 of the peg 513.

Figure 6:
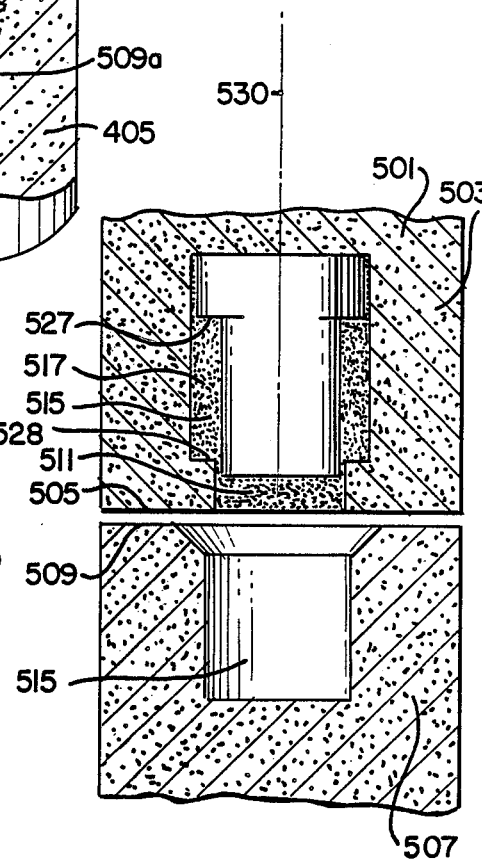
FIG. 6 is cross-sectional view of the electrode joint of FIG. 5 along the cylindrical axis and perpendicular to the view of FIG. 5.

An upper securing means 525 is provided by a mechanical interlock which comprises a peg abutment surface 527 and peg hole abutment, surface 529 in opposing relationship, so as to interfere with sliding of the upper portion 521 of the peg 513 from the peg hole 511, preferably the peg 513 is symmetrical about a plane passing through its longitudinal axis 530, with two peg abutment surfaces 527 on either side of the peg 513, and two opposing peg hole abutment surfaces 529 as shown in FIG. 6.

For insertion of the peg 513 into the peg hole 511 during assembly of the joint 501, means should be provided for insertion of the peg 513 into the peg hole 511 in proper alignment. This may be any suitable means e.g. by providing retractable peg or peg hole abutment surfaces 527, 529 which extend after inserting of the peg 513.

In a preferred embodiment an insertion hole is provided, which communicates with the peg hole and is sized to allow insertion of the peg through the insertion hole into the peg hole in proper alignment. The insertion hole opening is preferably in the bottom surface and is contiguous with the opening of the peg hole, and has an axis parallel to the peg hole. Alternatively, the opening of the insertion hole may be in the top or in the lateral wall of the upper member.

Referring to FIGS. 5 and 7, insertion hole 531 extends from the bottom surface 505 with an opening contiguous with the opening of the peg hole 511, together forming a generally oval shaped opening. The pitch plug 517 preferably occupies the volume in the insertion hole 531 in addition to the volume of the peg hole 511.

Figure 9:
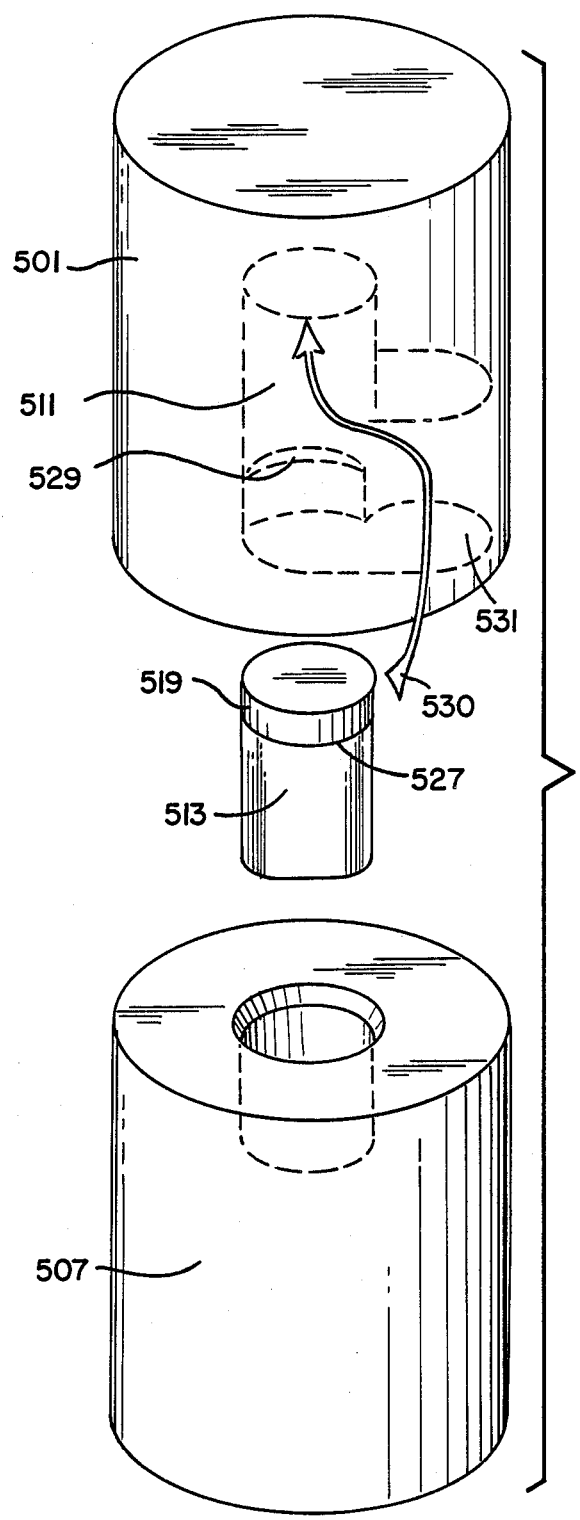
FIG. 9 is an exploded view of a joint with a similar configuration to that of FIG. 5.

FIG. 9 shows a portion of a joint of the invention in an exploded view of a configuration similar to that illustrated in FIGS. 4 to 8 with the reference numbers referring to analogous structures. FIG. 9 only show the core portion, with the maintaining means (threaded socket and threaded nipple) portions deleted for clarity. In addition, only one peg hole abutment surface 529 is shown for clarity. The joint 501 is assembled by inserting the peg 513 into the opening of the insertion hole 531, with the upper portion 519 inserted first, as illustrated by the arrow 530. After the peg 513 is inserted into the insertion hole 531 sufficiently such that the peg abutment surfaces 527 are above the peg hole abutment surfaces 529, the peg is moved laterally into the peg hole 511 until the peg abutment surfaces 527 are in an opposing relationship with the peg hole abutment surfaces 529. If necessary the peg is rotated about its longitudinal axis to align the peg abutment surfaces 527 with the peg hole abutment surfaces 529. If necessary, the peg 513 is then further inserted into the peg hole 511 such that the peg 513 is completely in the peg hole. Melted pitch is then poured into the peg and insertion holes 511, 531, which upon solidification provides the pitch plug and the releasable retention means. The lower member 507 is then assembled in alignment with the catch hole 515 in alignment with the peg hole 511.

Figures 10A, 10B:
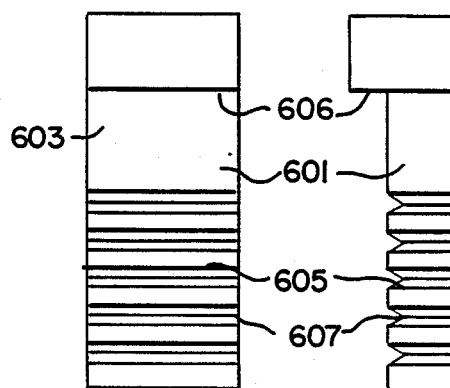
FIGS. 10(a), 10(b), and 10(c), are views of a preferred peg for use in the joints of the invention.
Figure 10C:
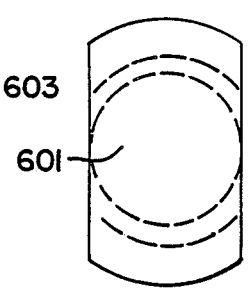

A preferred peg for use in a joint of the invention, particularly a joint of the type illustrated in FIGS. 4 to 9 is shown in FIGS. 10(a). 10(b). and 10(c). FIG. 10(a) is a side view, 10(b) a front view. and 10(c) a top view. Peg 601 comprises upper portion 603 lower portion 605, and peg abutment surfaces 606.

The lower portion 605 of the peg 601 has circumferential grooves 607 in its surface. The grooves 607 in the surface of the lower portion 605 provide for an irregular clearance between a catch hole wall and a surface of the lower portion 605 when the lower portion 605 slides into the catch hole. Pitch flows into the clearance, including the grooves 607, and forms coke to provide the lower securing means. Because of the irregular surface provided by the grooves 607, the coke provides a greater interference and secures the peg 601 more substantially in the catch hole than for a similar peg without grooves. Therefore, a better bond for the lower securing means is provided.

EXAMPLE 1

A two peg electrode joint according to the embodiment of the invention shown in FIG. 1, was manufactured by altering a conventional tapered and threaded nipple, and socket joint. Peg holes were drilled in the base of the connecting nipple along its cylindrical axis, and in the base of the lower socket of an upper electrode segment. Graphite pegs were secured between plugs of pitch in the peg holes. Corresponding catch holes were drilled in the top of the connecting nipple and the base of the upper socket of a lower electrode segment. The openings of the catch holes were tapered.

The joint was assembled in the configuration shown in FIG. 1, and placed into a furnace and heated to 800° C. to simulate the use of the joint in an arc furnace. The heating in the furnace cause the joint to function as described for FIGS. 1 to 3, above.

The dimensions of the joint are shown in Table A;

TABLE A

| Joint Dimensions I | | |
| --- | --- | --- |
| | (in) | (cm) |
| Diameter of Electrode Segments | 5. | 12.7 |
| Diameter of Threaded Nipple | 3. | 7.6 |
| Length of Threaded Nipple | 5. | 12.7 |
| Diameter of Catch and Peg Holes | 0.5 | 1.3 |
| Depth of Catch Holes | 0.75 | 0.9 |
| Length of Pegs | 2.0 | 5.1 |
| Length of Lower Pitch Plugs | 0.5 | 1.3 |
| Length of Upper Pitch Plugs | 0.5 | 1.3 |

The resistance to unscrewing was determined by measuring the torque required to unscrew an assembled joint. For comparison, a PRF joint with electrode segments and threaded nipples of the same size were manufactured, with lateral holes drilled through the nipples and filled with pitch according to the teachings of U.S. Pat. No. 2,735,705. The torque required to unscrew the electrodes was measured, and it was found that the torque required to unscrew the electrodes of the invention was from 5 to 10 times greater than the torque required for the PRF electrodes.

EXAMPLE 2

Joints were made as illustrated in FIGS. 4 to 9 were manufactured and tested. For the test only the axial core portion of the joint containing the peg, catch and insertion hole, were manufactured on electrode segments 5 inches in diameter. The bottom surface of the upper member and the top surface of the lower member were maintained in alignment by a metal jig rather than by a conventional threaded socket and nipple configuration. The test electrode segments and peg appeared essentially as shown in FIG. 9, except the lower segment included a lip to maintain the top and bottom surfaces spaced from one another.

The joint was assembled in the configuration shown in FIGS. 5 and 6, and placed into a furnace and heated to 800° C. to simulate the use of the joint in an arc furnace. The heating in the furnace cause the joint to function as described for FIGS. 5 to 8, above.

The dimensions of the joint are shown in Table B. The dimensions of the joint, and the peg, peg hole, and insertion hole, was the same contemplated for use on a two-peg joint with a threaded male nipple and two female sockets of conventional dimensions for a 24-inch electrode.

TABLE B

| Joint Dimensions II | | |
| --- | --- | --- |
| | (in) | (cm) |
| Diameter of Catch Hole and Peg | 2.0 | 5.1 |
| Width of Combined Insertion/Peg Hole Opening | 2.0 | 5.1 |
| Length of Combined Insertion/Peg Hole Opening | 3.3 | 8.2 |

TABLE B-continued

| Joint Dimensions II | | |
| --- | --- | --- |
| | (in) | (cm) |
| Depth of Catch Hole | 1.0 | 2.5 |
| Length of Peg | 3.4 | 8.9 |
| Width of Peg & Peg Hole Abutment Surfaces | 0.2 | 0.5 |

The tensile strength of the joints was determined by measuring the tensile force on the electrode column required to break the joint. The tensile force was 2,000 to 3,000 pounds force (8900-13300 Newtons) on the samples tested. This strength would be sufficient to independently support a 90 inch long bottom graphite electrode column, 24 inches in diameter, without additional support from a threaded socket and nipple components of the joint.

While this invention has been described with reference to certain specific embodiments and examples, it is recognized by those skilled in the art that many variations are possible without departing from the scope and spirit of the invention, and that the invention, as described by the claims, is intended to cover all changes and modifications which do not depart from the spirit of the invention.

What is claimed is:

1. A joint for a carbon electrode which comprises:
an upper member with a bottom surface;
a lower member with a top surface;
means for maintaining the top surface and bottom surface in opposing relationship;
a peg hole extending from the bottom surface into the upper member;
a peg dimensioned to slide in the peg hole;
releasable retention means in the peg hole which retains the entire length of the peg in the peg hole, which upon heating of the joint to an operating temperature releases the peg to slide within the peg hole;
a catch hole extending from the top surface into the lower member, the catch hole being aligned with the peg hole such that when the peg is released, a lower portion of the peg slides from the peg hole into the catch hole with an upper portion of the peg remaining in the peg hole;
upper securing means which secures the upper portion of the peg in the peg hole after the lower portion of the peg has slid into the catch hole; and
lower securing means which secures the lower portion of the peg in the catch hole after the lower portion of the peg has slid into the catch hole.

2. The joint of claim 1 wherein the retention means comprises solid pitch disposed in the peg hole to retain the peg in the peg hole such that upon heating the joint to an operating temperature the pitch melts to release the peg and allow the lower portion to slide into the catch hole.

3. The joint of claim 1 wherein the upper securing means is provided by solid pitch disposed in the peg hole such that after the lower portion of the peg slides into the catch hole, the pitch melts and flows in a space between a wall of the peg hole and a surface of the upper portion of the peg and cokes to secure the lateral wall of the peg hole and the surface of the upper portion of the peg together.

4. The joint of claim 1 wherein the lower securing means is solid pitch disposed in the peg hole such that after the lower portion of the peg slides into the catch hole, the pitch melts and flows in a space between a wall of the catch hole and a surface of the lower portion of the peg and cokes to form a bond between the wall of the catch hole and the surface of the lower portion of the peg.

5. The joint of claim 1 wherein the retention means and the lower securing means is provided by pitch to retain the peg in the peg hole such that upon heating the joint to the operating temperature, the pitch melts to release the peg and allows the lower portion of the peg to slide into the catch hole, and the melted pitch flows in a space between a wall of the catch hole and a surface of the lower portion of the peg and cokes to form a bond between the wall of the catch hole and the surface of the lower portion of the peg.

6. The joint of claim 1 wherein the upper member comprises an electrode segment with a threaded male nipple and the bottom surface corresponds to the end face of the threaded nipple with the peg hole aligned along the center axis of the nipple, and wherein the lower member comprises an electrode segment with a female threaded socket and the top surface corresponds to the base of the socket with the axis of the catch hole aligned along the center axis of the socket.

7. The joint of claim wherein the upper member comprises an electrode segment with a female threaded socket and the bottom surface corresponds to the base of the socket with the axis of the peg hole aligned along the center axis of the socket. and the lower member comprises an electrode segment with a threaded male nipple and the top surface corresponds to the end face of the threaded nipple with the catch hole aligned along the center axis of the nipple.

8. The joint of claim 1 wherein the upper securing means is provided by an upper pitch plug, and the retaining means and the lower securing means are provided by a lower pitch plug with the upper pitch plug, the peg, and lower pitch plug aligned axially within the peg hole, the outer pitch plug proximate to the opening of the peg hole, and the peg is disposed between the inner pitch plug and the outer pitch plug.

9. The joint of claim 1 wherein the upper securing means is a mechanical interlock between the upper portion of the peg and the upper segment.

10. The joint of claim 9 wherein said upper retaining means comprises a peg abutment surface on the peg and a peg hole abutment surface in the peg hole, the peg abutment surface and peg hole abutment surface in opposing relationship to resist the sliding of the upper portion of the peg from peg hole.

11. The joint of claim 10 additionally comprising an insertion hole to allow insertion and alignment of the peg in the peg hole with the peg abutment surface and the peg hole abutment surface in opposing relationship.

12. The joint of claim 11 wherein the insertion hole has an opening in the bottom surface contiguous with the opening of the peg hole and has an axis parallel to the axis of the peg hole.

13. The joint of claim 1 wherein the lower securing means is a mechanical interlock between the lower portion of the peg and the lower segment.

14. A joint for a carbon electrode which comprises:
an upper segment with a female threaded socket;
a lower segment with female threaded socket;
a threaded nipple screwed into each socket to join the upper and lower segments together;
a first peg hole extending from the base of the socket of the upper segment;
a first peg dimensioned to slide in the first peg hole;
first releasable retention means in the first peg hole which retains the entire length of the first peg in the first peg hole, which upon heating of the joint to an operating temperature releases the first peg to slide within the first peg hole;
a first catch hole extending from the top face of the nipple into the nipple, the first catch hole being aligned with the first peg hole such that when the first peg is released, a lower portion of the first peg slides from the first peg hole into the first catch hole with an upper portion of the first peg remaining in the first peg hole;
first upper securing means which secures the upper portion of the first peg in the first peg hole after the lower portion of the first peg has slid into the first catch hole;
first lower securing means which secures the lower portion of the first peg in the first catch hole after the lower portion of the first peg has slid into the first catch hole.
a second peg hole extending from the lower face of the nipple;
a second peg dimensioned to slide in the second peg hole;
second releasable retention means in the second peg hole which retains the entire length of the second peg in the second peg hole, which upon heating of the joint to an operating temperature releases the second peg to slide within the second peg hole;
a second catch hole extending from the base of the socket of the second segment, the second catch hole being aligned with the second peg hole such that when the second peg is released, a lower portion of the second peg slides from the second peg hole into the second catch hole with an upper portion of the second peg remaining in the second peg hole;
second upper securing means which secures the upper portion of the second peg in the second peg hole after the lower portion of the second peg has slid into the second catch hole; and
second lower securing means which secures the lower portion of the second peg in the second catch hole after the lower portion of the second peg has slid into the second catch hole.

* * * * *